United States Patent
McDermott et al.

(10) Patent No.: US 7,581,627 B2
(45) Date of Patent: Sep. 1, 2009

(54) VISCOUS CLUTCH WITH CONTROLLED DRAIN BACK

(75) Inventors: David L. McDermott, Wixom, MI (US); Joseph G. Sawyer, Grand Ledge, MI (US)

(73) Assignees: Behr America, Troy, MI (US); Behr Industry America, L.P., Belmont, MI (US)

( * ) Notice: Subject to any disclaimer, the term of this patent is extended or adjusted under 35 U.S.C. 154(b) by 343 days.

(21) Appl. No.: 11/436,340

(22) Filed: May 18, 2006

(65) Prior Publication Data
US 2007/0267267 A1    Nov. 22, 2007

(51) Int. Cl.
F16D 35/02    (2006.01)
(52) U.S. Cl. ............... 192/58.61; 192/58.6; 192/58.8
(58) Field of Classification Search ....... 192/58.5–58.9; 123/41.11–12
See application file for complete search history.

(56) References Cited

U.S. PATENT DOCUMENTS

| | | | | |
|---|---|---|---|---|
| 3,630,331 A | * | 12/1971 | Bradbury | 192/58.682 |
| 3,688,884 A | * | 9/1972 | Perrin et al. | 192/58.63 |
| 4,665,694 A | * | 5/1987 | Brunken | 192/58.681 |
| 4,903,805 A | * | 2/1990 | Ono | 192/58.681 |
| 5,060,774 A | * | 10/1991 | Takikawa et al. | 192/58.681 |
| 5,117,955 A | * | 6/1992 | Kikuchi | 192/58.681 |
| 5,501,183 A | * | 3/1996 | Takayama | 123/41.12 |
| 6,021,747 A | * | 2/2000 | Gee et al. | 123/41.12 |
| 6,085,881 A | * | 7/2000 | Robb | 192/58.682 |
| 6,125,981 A | * | 10/2000 | Ito et al. | 192/58.61 |
| 6,173,823 B1 | | 1/2001 | Moser et al. | |
| 6,935,478 B2 | | 8/2005 | Dräger et al. | |

OTHER PUBLICATIONS

"Trouble Shooter," by Karl Seyfert, *Motor*, Nov. 2003, pp. 4-5.

* cited by examiner

*Primary Examiner*—Richard M. Lorence
(74) *Attorney, Agent, or Firm*—Leydig, Voit & Mayer, Ltd.

(57) ABSTRACT

A viscous fluid clutch for controlling the rotation of an engine cooling fan has a dividing disk separating a storage chamber from a working chamber. The dividing disk includes an opening having a geometry that defines a drain-back path to the working chamber regardless of the angular orientation of the clutch.

18 Claims, 4 Drawing Sheets

VISCOUS CLUTCH WITH CONTROLLED DRAIN BACK

FIELD OF THE INVENTION

The present invention relates generally to the automotive vehicle art, and more particularly to a viscous clutch assembly that includes a controlled drain back feature for enabling proper clutch operation during an engine start-up condition or when other input conditions are present.

BACKGROUND OF THE INVENTION

The use of a viscous fluid clutch for controlling the rotation of an engine cooling fan in an automotive vehicle is known in the art. Prior to the use of a viscous fluid clutch and when fuel efficiency was not a significant concern, an engine cooling fan was coupled directly to a water pump shaft. The cooling fan was operative so long as the engine was running. In these prior configurations, the engine cooling fan speed was proportional to the engine speed. That is, the cooling fan spun faster as the engine speed increased. However, such continuous fan operation is unnecessary and somewhat wasteful. While it is needed at idle and slower vehicle speeds, the engine cooling fan becomes less important when a vehicle is traveling at higher speeds because outside air is forced through the radiator without the aid of the fan.

This realization, and the need for greater fuel efficiency, led to the development cooling fan viscous clutches. The viscous clutch allows the fan blades to essentially freewheel when the extra cooling assistance provided by the fan is unnecessary. This feature has resulted in enhanced fuel economy and the reduction of unnecessary noise generated in the engine compartment. Specifically, many vehicles employ a multi-blade cooling fan that is secured to the viscous fan clutch. The viscous clutch is installed between an accessory pulley (typically a water pump pulley) of the vehicle and its radiator. The viscous clutch is designed to drive the fan at high speeds during desired operating modes, which can approach the input speed of the viscous clutch. This may approach the rotational speed of the engine.

The operation of the viscous clutch may be controlled as a function of the engine's operating temperature. In these thermostatically controlled arrangements, the clutch operates to drive the fan approaching engine speeds when cooling is required. On the other hand, the viscous clutch permits the fan to operate at low speeds when cooling is not required. Such thermostatic control of the fan through the clutch reduces airflow noise caused by fan rotation and load on the engine. This results in increased horsepower and improved fuel economy.

Known thermostatically controlled viscous clutch systems rely on the temperature of the air passing through the radiator or the temperature of the cooling water of the engine to switch the on/off control for the fan. While these prior art viscous fan clutches have met with wide acceptance with automotive and truck manufacturers, more accurate control of the viscous fan clutch offers additional advantages. Complex engine control management systems have been incorporated into most automotive and truck vehicles to control emissions, fuel economy as well as other engine operating characteristics. Because they provide improved monitoring of numerous operating parameters of the engine, it is desirable to utilize these engine management control systems to control operation of the viscous clutch as well.

However, the use of engine management control systems to control viscous clutch operation has led to certain problems. In particular, most viscous coupling fan drives are not engaged or maintained in a working state when the vehicle is in an off state. In the off state, much of the viscous coupling fluid is evacuated from the torque transfer or working chamber. However, an insufficient volume of fluid in the working chamber may result in an improper response of the clutch during vehicle start-up conditions. This is because the shear rate of the viscous fluid is dramatically increased such that the residual fluid in the working gap is unable to behave in a viscous manner. In this "stall mode" or under-speed condition, the fluid cannot sufficiently transfer torque to the clutch output and to the fan to meet the cooling needs of the system. This condition may persist even though the engine control management system provides signals to actuate the clutch at its upper limit. In some instances, the under-speed problem will persist for several minutes or longer unless input conditions of the vehicle changed.

Thus, it would be advantageous to have a viscous fan clutch that achieves proper response characteristics, even during start-up conditions or when other operating conditions are present.

SUMMARY OF THE INVENTION

The present invention provides an electro-viscous fan clutch assembly that includes a drain back feature for controlling the amount of fluid that passes between a storage chamber and a working chamber. In one preferred embodiment of the invention, an electro-viscous clutch assembly includes a clutch input portion having ring-shaped projections and a clutch output portion having complementary ring-shaped projections proximate to clutch input projections to define a working chamber or working gap. The output portion is sized to receive a dividing disk that, together with the output portion, defines the viscous fluid storage chamber. The dividing disk includes an opening formed therein having a non-uniform geometric pattern that controls an amount of viscous fluid that exits the storage chamber and is supplied to the working chamber during certain conditions, regardless of the angular orientation of the dividing disk and/or the clutch assembly. In this way, the amount of fluid present in the working chamber is sufficient to enable the clutch assembly to have a suitable response characteristic. In this way, the clutch assembly is operative under a wide range of working conditions.

Other objects and advantages of the invention will become apparent upon reading the following detailed description and upon reference to the drawings, in which:

Figure 1:
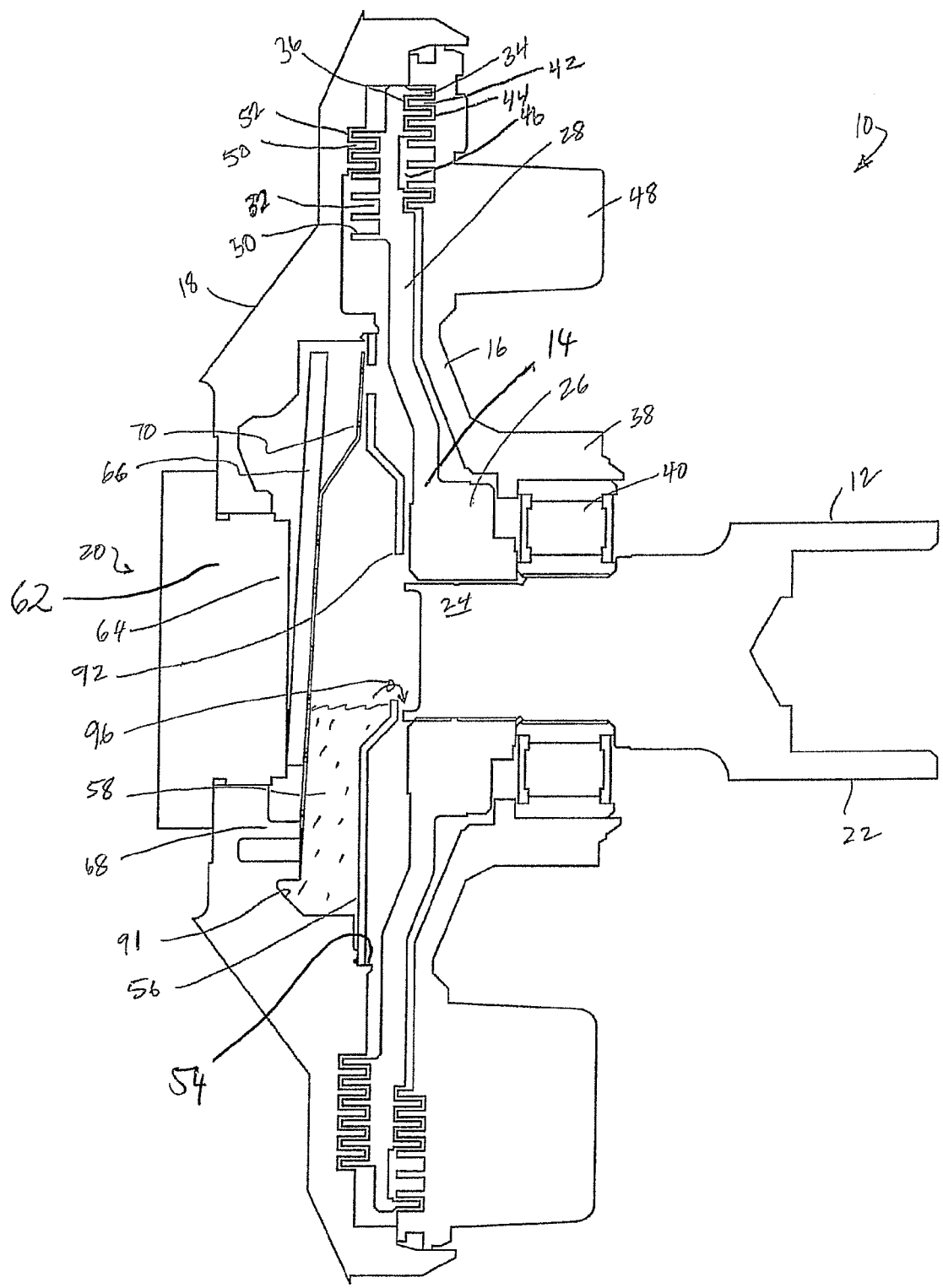
FIG. 1 is a section view of an illustrative viscous clutch assembly in accordance with one embodiment of the invention.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Generally, the present invention relates to a viscous clutch assembly that includes a controlled drain back feature. Specifically, the clutch assembly includes a dividing disk that separates a viscous fluid storage chamber from a fluid working chamber for the clutch assembly. The dividing disk includes an opening formed therein that has a non-uniform geometric pattern to control an amount of viscous fluid provided to the working chamber during certain clutch operating conditions, regardless of the angular orientation of the dividing disk and/or the clutch assembly. In this way, the amount of fluid provided in the working chamber exceeds an amount that prevents the clutch from operating in an undesired "under-speed" or "stall" mode.

Referring now more particularly to the drawings, there is shown an illustrative electro-viscous clutch assembly 10 which has particular utility in an internal combustion engine for automotive vehicles and the like. The main structural components of the clutch assembly 10 include an input drive shaft 12, an input clutch or rotor portion 14, a clutch housing portion 16, an output portion 18 and an electromechanical actuator assembly 20. As shown in FIG. 1, the input drive shaft 12 is coupled with the input clutch portion 14 in a conventional manner as will be understood by those skilled in the art. That is, the input shaft 12 is a generally cylindrical shaft which defines an input end 22 and an output end 24. The input end 22 is adapted to be coupled to an output power source of the engine, typically the water pump. The output end 24 is used to drivingly connect input shaft 12 to the input clutch portion 14. While the illustrated clutch assembly 10 is described in connection with the control of an engine cooling fan for automotive vehicles, it will be understood that the clutch assembly, including the controlled drain back feature thereof, can be used for other applications and uses in which it is desired to regulate the amount of fluid that is to be present in the working chamber of a rotatable assembly.

The input clutch portion 14 includes a hub 26, fixedly secured to the output end 24 of the shaft 12, and a rotor 28, extending radially outwardly from the hub 26. A plurality of radially spaced, generally circumferentially running and axially extending projections such as projection 30 are formed on at least one side of the rotor 28, proximate to the distal end thereof. The projections 30 define complementary spaced grooves such as groove 32. Similarly, the rotor 28 includes a second group of radially spaced projections such as projection 34, which are formed on the opposite side of the rotor 28 proximate to the distal end thereof. These projections 34 also define complementary grooves such as groove 36. As explained in greater detail below, the projections 30, 34 and complementary grooves 32, 36 permit the development of frictional fluid engagement between the input clutch portion 14 and the clutch output 16.

As shown in FIG. 1, the clutch housing portion 16 includes a hub 38 that is freely rotatable about the input shaft 12 by a bearing 40. The housing 16 further includes a plurality of radially spaced projections such as projection 42. The projections 42 define complementary grooves such as groove 44. The projections 34 and grooves 36 formed in the clutch input portion 14 cooperate with the projections 42 and grooves 44 formed in the clutch housing 16 when viscous fluid is disposed in a working gap 46 defined between the projections and grooves of the clutch input and clutch housing portions.

In addition, the clutch housing 16 includes a plurality of fins 48 for dissipating heat generated by the clutch assembly 10 and for creating air flow.

The clutch output portion 18 similarly includes a plurality of radially spaced projections such as projection 50 formed on the inner surface thereof. The projections 50 define cooperating grooves 52. As with the projections and grooves of the clutch housing 16, the projections 50 and grooves 52 cooperate with the projections and grooves formed in the clutch input portion 14 when viscous fluid is present in the working gap 46.

As the amount of viscous fluid disposed within the working gap 46 increases, the shearing of fluid within the working gap 46 will transmit a driving torque from the clutch input portion 14 to the output portion 18 and the housing portion 16. When sufficient viscous fluid is disposed in the working gap 46 at the proper temperature and, as explained in greater detail below, the rotational speeds of the clutch input and output portions are within a working range, the input portion 14 achieves a direct coupling with the output portion 18. Because the engine cooling fan is directly coupled with the output portion 18, the cooling will also rotate at this speed.

In accordance with the invention, the output portion 18 contains a dividing disk for permitting a predetermined amount of viscous fluid to flow from a storage chamber into a working chamber when the vehicle is in an inoperable state. Specifically, the dividing disk contains an opening with a geometric shape that is sized to conform to various components disposed in the storage chamber. This presents an opening to permit a predetermined amount of viscous fluid drainage to the working chamber to avoid excess evacuation of viscous fluid from the working chamber in various angular orientations of the clutch assembly.

In a preferred embodiment, the clutch output 18 includes a centrally disposed opening 54 that is sized to receive a dividing disk 56. As explained in greater detail below, the dividing disk 56 and an inner surface of the clutch output housing 18 cooperatively define a fluid storage chamber 58 disposed generally centrally within the output portion 18. The storage chamber 58 contains a predetermined volume of viscous fluid. In this regard, the dividing disk includes a valve opening 60 located proximate to the outer circumference of the disk 56.

For permitting viscous fluid to exit the storage chamber 58 and to enter the working chamber 46 in a controlled fashion, the electromechanical actuator assembly 20 provides controlled opening and closing of the valve opening 60 disposed in the dividing disk 56. In the preferred embodiment, the actuator assembly 20 includes an electromagnet 62 that is disposed in an opening formed in the output portion 18. The electromagnet 62 receives control signals from an engine management control system as will be understood by those skilled in the art. In the illustrated embodiment, the electromagnet 62 includes an engagement coil 64 that cooperates with a spring arm 66. The spring arm 66 has one end thereof fixedly secured to a boss 68 located formed on the inner surface of the output portion 18 (see FIG. 2) with the use of a screw (not shown). The spring arm 66 is in fixed engagement with an elongate valve member 70 that also has an end attached to the output body 18 via a screw (not shown) mounted within the boss 68 formed within the output portion 18.

When it is desired to control the amount of fluid that is supplied to the working chamber 46, the engagement coil 64, upon receipt of appropriate control signals, becomes energized. This causes the spring arm 66 and valve 70 to move from a closed position, in sealing engagement with the valve opening 60, to an open position. Similarly, when the engagement coil 64 is de-energized, the valve 70 is moved from an open position, away from the valve opening 60, to a closed position. In this way, when the engagement coil 64 is energized, it operates to open the spring-loaded valve 70 to thereby allow viscous fluid to flow from the storage chamber 58 to the fan clutch fluid coupling, namely the working chamber 46, thereby increasing the fan speed. In addition to the valve arrangement, the clutch output portion 18 includes a return opening 72, formed in the output portion 18 between the clutch engaging projections viscous fluid disposed within the working gap 46.

The timing for supplying power and the amount of power to be supplied is determined by an exterior system which is typically part of the engine control management system. Even though the cooling fan is under control of the electronic management system, the viscous coupling may take an amount of time for the cooling fan to respond. In a preferred embodiment, the engine control management system includes a powertrain control module (PCM) for monitoring various parameters to determine the appropriate fan speed: (1) engine coolant temperature; (2) air conditioning refrigerant pressure; (3) vehicle speed; (4) intake air temperature; (4) transmission fluid temperature; and (5) ambient air temperature. The engine control management system regulates a pulse width modulated (PWM) signal to the electromechanical actuator assembly 20 to control clutch engagement. The ON time of the PWM signal increases in response to the signal provided by the engine control management system to actuate the cooling fan.

Thus, in operation, the coupling between the clutch input and output can be relatively precisely controlled through actuation and de-actuation of the electromechanical actuator assembly 20. However, certain conditions in a vehicle can create high shear rates within the clutch assembly 10. Because the fluid used for viscous coupling within the fan drive is a non-newtonian visco-elastic fluid, some high shear rate conditions cause the fluid to act in an elastic manner. This results in the loss of the ability to transfer torque to the clutch output 18 and to the fan.

One such driving condition occurs when the vehicle is in the off state. Most viscous coupling fan drives are seldom required to be engaged or maintained in a working condition when the vehicle is off. Because there is no fluid being supplied to the working chamber, most of the coupling fluid is evacuated from the torque transfer area or working chamber via its return path. However, the exact amount of evacuated fluid depended on various conditions, such as the angle at which the clutch assembly ceased rotation and the orientation of the vehicle. Heretofore, an insufficient amount of fluid present in the working gap at start-up of the engine could result in an improper response of the clutch. During vehicle start-up conditions, the shear rate is dramatically increased such that the residual fluid in the working gap is unable to behave in a viscous manner. In this "stall mode" or under-speed condition, the viscous fluid cannot sufficiently transfer torque to the clutch output and to the fan to meet the cooling needs of the system. As a practical example of the under-speed problem, the output speed of the cooling fan may not exceed a range of about 200 r.p.m. in this condition. This results in diminished air flow through the condenser to thereby prevent proper operation of the vehicle air conditioning system. The under-speed condition could persist even though the engine control management system provided signals to the electromechanical actuator 20 to actuate the valve 70 at its upper limit.

Perhaps more problematic, a "stall mode" or under-speed condition was heretofore an unpredictable phenomena. That is, such a condition was dependent on various input conditions of both the vehicle and the clutch assembly 10, such as the temperature of the fluid, the external temperature and the like. Therefore, correction of the condition was essentially guesswork, and often occurred as a result of changing the input parameters to the vehicle such that the clutch assembly could return to a normal operating mode.

In accordance with the invention, a controlled amount of viscous fluid is drained back from the storage chamber to the working gap when the clutch assembly is in an inoperative or shut-down mode. This ensures that the clutch assembly 10 will not achieve a "stall mode" or under-speed condition during start-up of the vehicle. At the same time, the invention prevents an excessive amount of fluid from impinging the working gap to avoid a fan over-speed for the specific needs of the engine. As noted above, excessive fan speed reduces fuel economy and creates undesired noise in the engine compartment.

Figure 2:
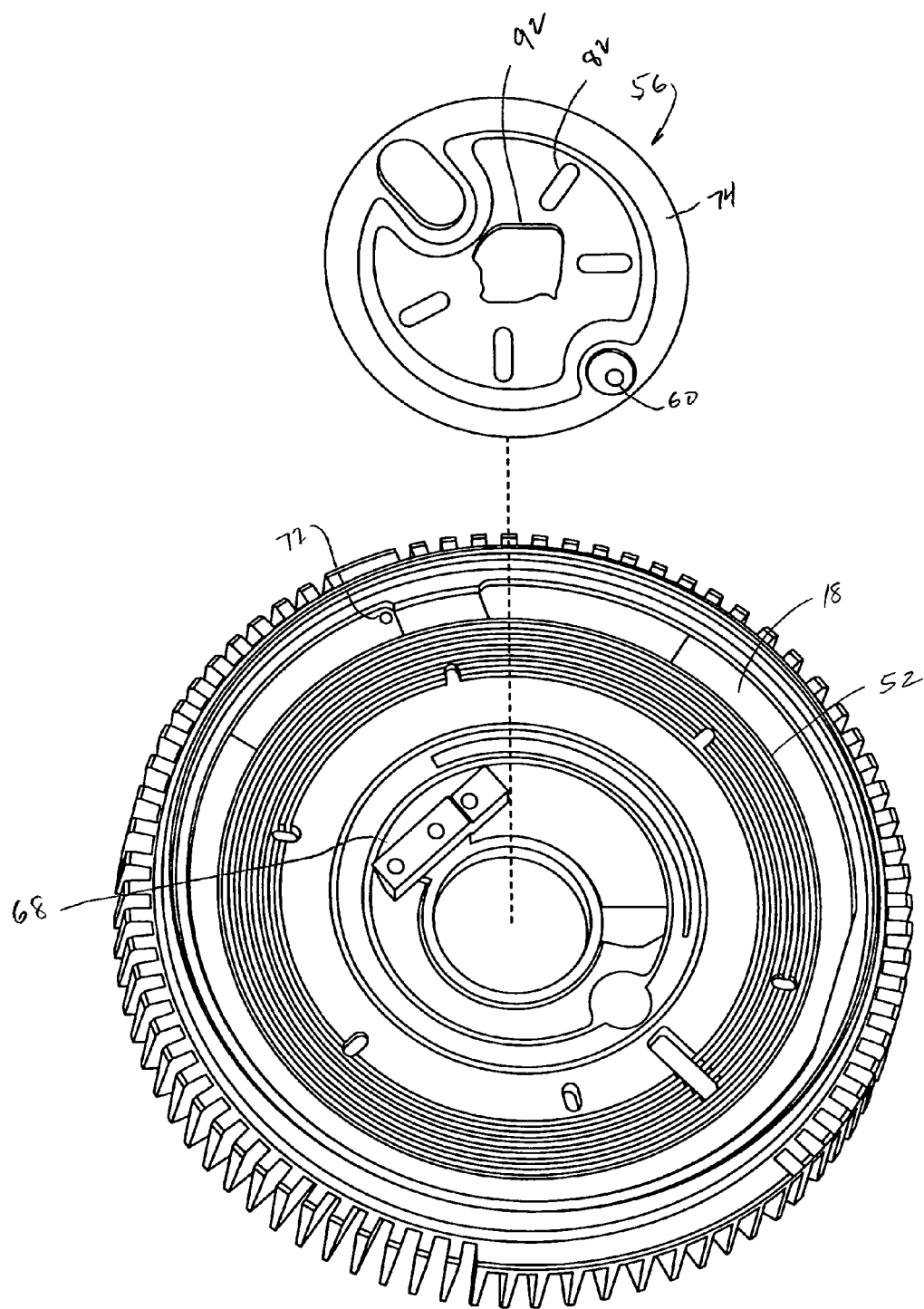
FIG. 2 is an exploded view of a dividing disk and clutch output portion according to the embodiment shown in FIG. 1.
Figure 3:
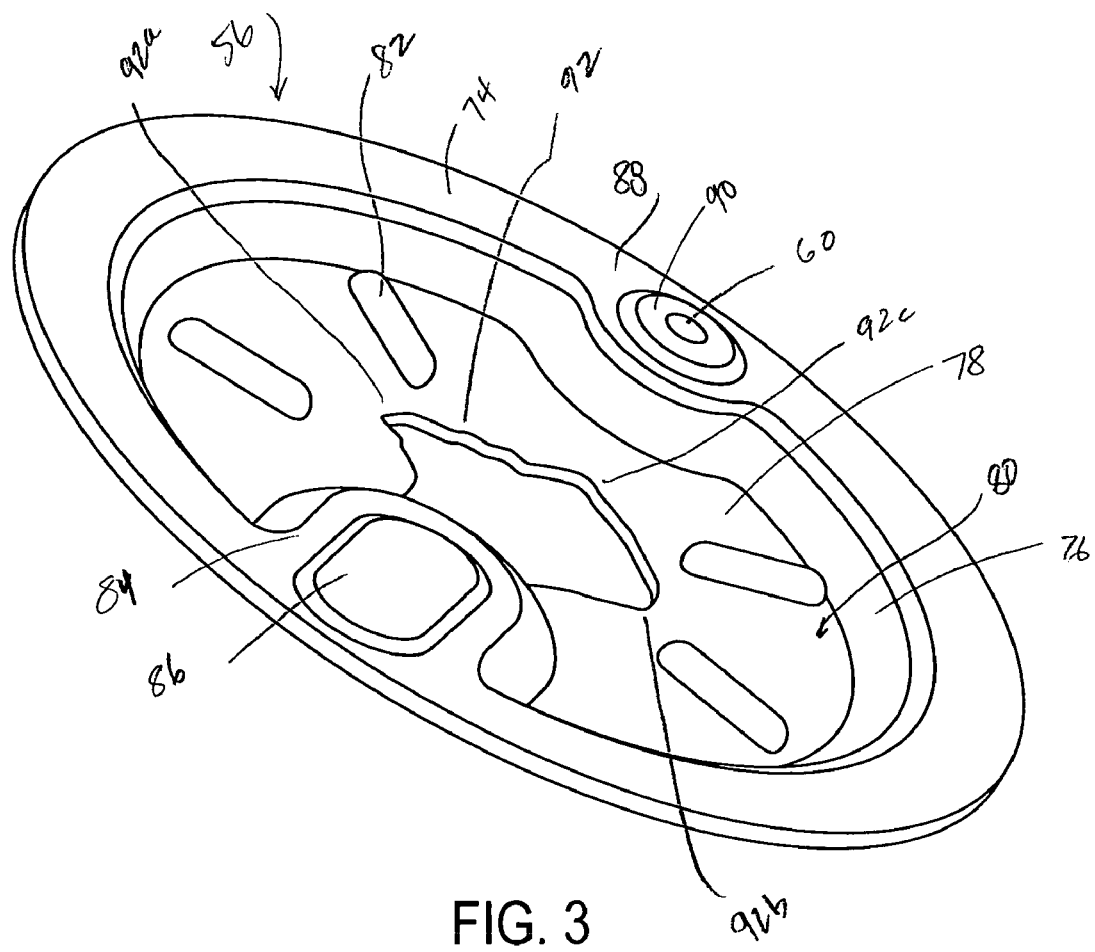
FIG. 3 is an isometric view of the dividing disk illustrated in FIG. 2.
Figure 4:
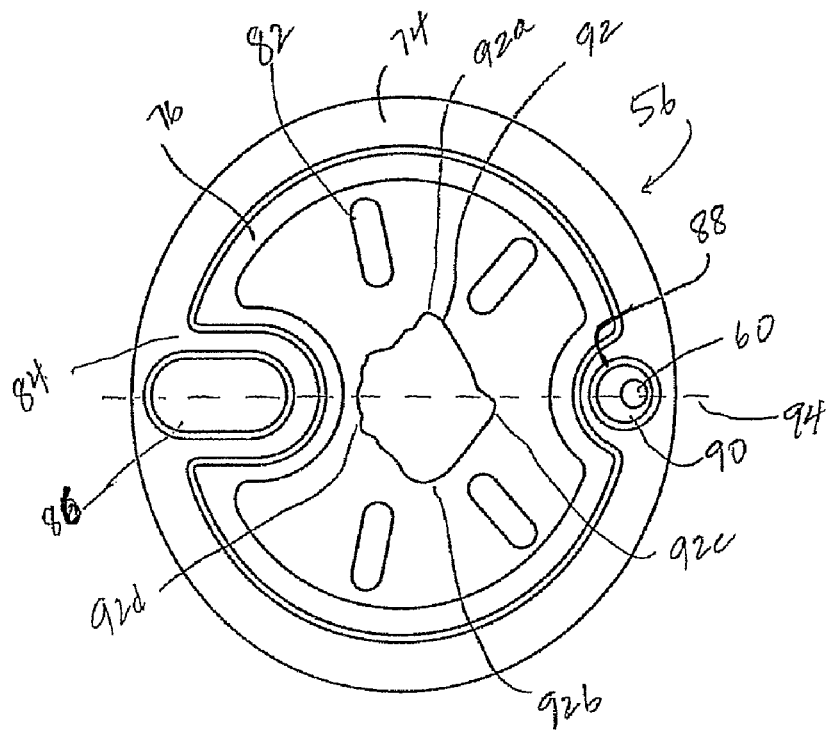
FIG. 4 is front view of the dividing disk shown in FIG. 3.

The structural details of the dividing disk 56 are best seen in FIGS. 2, 3 and 4. The dividing disk 56 is preferably fabricated of steel and includes an outer circumferential rim 74 that is sized to matingly engage with a central opening 54 formed in the clutch output portion 18. As best seen in FIG. 3, a depressed portion 76 is formed around the inner periphery of the rim 74 and merges with a relatively planar disk side-wall 78. The contour of the depressed portion 76 and the disk side-wall 78 defines a cavity 80, disposed radially inwardly from the rim 74. The disk side-wall 78 further includes a plurality of angularly spaced baffle segments such as segment 82. The baffles operate to reduce the vibration generated by rotation of the dividing disk 56.

The outer rim 74 further defines a first generally raised portion 84 which has a generally oval depression 86 formed therein for enhancing proper flow of the viscous fluid within the storage chamber 58 when disposed proximate to the valve. In addition, the outer rim 74 has a second generally raised curved portion 88 defined therein for providing a generally planar seat surface 90 for proper mating engagement with the valve 70 (see FIG. 1).

In a preferred embodiment, the dividing disk 56 cooperates with an inner surface 91 (see FIG. 1) of the clutch output portion 18 to define fluid storage chamber 58. Specifically, as shown in FIG. 1, the cavity 80 formed in the dividing disk 56, as well as the contour of the clutch output inner surface 91, are sized to define a storage chamber that contains a predetermined volume of viscous fluid. As shown in FIG. 1, due to the operating components of the clutch assembly 10, the storage chamber 58 also includes various components disposed therein, including the spring arm 66, valve 70 of the electromechanical actuator assembly 20. Similarly, the clutch output portion itself is formed to include the boss 68 for securing one end of the spring arm 66, which also contributes to the non-uniformity of the storage chamber.

In accordance with one aspect of the invention, the dividing disk 56 includes a generally centrally disposed opening 92 of a non-uniform shape for providing drain-back of viscous fluid from the storage chamber to the working area or working gap. The non-uniform shape of the drain-back opening 92 provides a generally uniform amount of drain-back regardless of the angular orientation of the dividing disk 56 and of the clutch assembly 10. In a preferred embodiment, the contour of the opening 92 is irregular and is defined by opposed first and second apex regions 92a, 92b disposed laterally from an axis 94 extending through the valve opening 60 and raised portion 84 of the dividing disk 56. Likewise, the opening 92 includes a third apex region 92c, disposed proximate to the valve opening 60 and slightly offset from the axis 94. Due to the available disk real estate and the characteristics of the storage chamber, the opening 92 has a generally flattened region 92d disposed proximate to the disk raised portion 84.

Thus, the contour of the drain-back opening 92 conforms to the volume characteristics of the storage chamber, while providing substantially the same amount of fluid drain-back to the working gap in any angular orientation. That is, the irregular shape of the opening 92 accounts for the irregular shape and geometry of the storage chamber as well as the components disposed therein. The specific contour of the opening 92 is dependent on variable factors in a complex system. That is because, among other things, the fan torque that is required during a vehicle start-up condition is dependent on, and optimized for, the overall drive system of the vehicle. In addition, factors such as the viscosity of the viscous fluid, the temperature of the viscous fluid, the ambient temperature, the clutch mass, vehicle orientation and input control signals provided by the engine control management system influence the manner in which the viscous clutch operates. It follows that the fluid volume that is required in the working chamber to operate in a viscous manner during start-up is also dependent on a large number of variables. Therefore, in addition to the volume and shape of the storage chamber itself, the contour of the drain-back opening 92 is also dependent on a number of other variables in the complex system of which it is a part.

Accordingly, those skilled in the art should appreciate that the specific contour of the drain-back opening 92 shown in FIGS. 2-5 is optimized for the particular viscous clutch assembly 10 illustrated herein. This contour, however, would not necessarily be optimal, and may not even be operable, in other viscous clutch assemblies. Depending on the storage chamber geometry and other variables in the system, it is contemplated that the contour of a drain-back feature for utilization in other embodiments will have substantially different shapes. In this regard, the drain-back feature may be implemented with more than one opening.

The particular geometry of the drain-back opening for a given clutch application may be ascertained in any number of ways, and it may be developed empirically through the application of experimental results. In a preferred embodiment, the geometry is derived through a series of bench trials or other simulations that measure the viscous fluid level in the storage chamber for a number of rest angles of the clutch. As used herein, the phrase "rest angle" of the clutch is the angle formed between an axis perpendicular to a known surface (such as the ground) when the clutch ceases rotation and an arbitrary fixed axis, such as the axis 194 shown in FIG. 5. Because the clutch assembly may cease rotation at any angular orientation, the rest angle will be arbitrary for any given trial unless the assembly is intentionally rotated to a desired angle.

The contour of the opening is gradually altered to achieve drain-back from the storage chamber to the working chamber at the varying rest angles and then retested. Through this iterative process, an optimum drain-back contour may be developed. Alternatively, or in addition to applying a series of bench trials to ascertain the appropriate drain-back opening geometry, the clutch assembly 10 may be analyzed through a number of vehicle trials. Again, such vehicle trials are preferably performed such that the clutch assembly is examined at varying clutch rest angles. Vehicle trials provide an added benefit in that the drain-back opening may be optimized to account for the orientation of the vehicle itself, such as in an up-hill or down-hill orientation. Those skilled in the art will appreciate that other methodologies may be employed to develop the contour for the drain-back feature, such as statistical analyses or finite element analyses of the clutch assembly components.

In operation, the electro-viscous clutch assembly 10 receives control signals from the engine control management system. Specifically, the control management system provides pulse width modulated (PWM) signals to the electromechanical actuator assembly 20 to control the amount of viscous fluid that is supplied from the storage chamber 58. When the actuator 20 is energized, it opens the spring-loaded valve 70 and allows fluid to flow from the storage chamber 58 to the clutch working area 46. During normal operating conditions, the fluid coupling engages the clutch output portion 18 to thereby increase the cooling fan speed.

The rotation of the clutch assembly 10 generates a centripetal force that urges the fluid from the valve opening 60 to the working chamber 46. When the electromechanical actuator 20 is de-energized, the spring-loaded valve 70 closes. This blocks the viscous fluid path to the clutch working area 46, thereby reducing the amount of viscous fluid in the working area 46. Due to the diminished coupling of the input clutch portion 14 and output clutch portion 18, the engine cooling fan speed is reduced. In addition, viscous fluid circulates back to the storage chamber 58 via the return path 72 (FIG. 2).

For controlling the amount of viscous fluid that is passed back into the working chamber during the off-state of the clutch assembly, the disk opening 92 provides a controlled drain-back to the working chamber 46. This enables a selected amount of additional viscous fluid to spill over from the storage chamber 58 into the working chamber 46, as shown by the arrow 96 in FIG. 1. In keeping with the invention, it has been found that providing the working chamber 46 with a sufficient volume of viscous fluid to enable the clutch output speed to be greater than about 300 to 400 r.p.m. prevents a stall mode or under-speed condition. That is, because the clutch assembly has a sufficient initial volume of viscous fluid in the working chamber to achieve such speeds, the rotation of the clutch assembly 10 generates sufficient centripetal force to pass viscous fluid exiting the storage chamber.

In the absence of the invention, when the angular speed of the clutch output 18 is insufficient to properly urge viscous fluid to the working area 46, despite a fully ON actuation of the electromagnetic actuator 20, an under-speed condition may persist. That is, the command signals provided by the engine control management system to engage the clutch assembly 10 may be insufficient to engage the clutch due to an insufficient volume of viscous fluid in the working chamber 46.

The volume of viscous fluid that is required to prevent a "stall mode" or under-speed condition depends on various factors, including the mass of the clutch, the torque required to rotate the cooling fan, the viscosity of the fluid. In a preferred embodiment, the volume of fluid that would be retained in the working chamber when the clutch assembly 10 is off is about 12 cubic centimeters (ccs) in the absence of the dividing disk opening. This may be an insufficient amount at start up of the engine to maintain shearing of the viscous fluid. With employment of an embodiment of the invention, the volume of viscous fluid present in the working chamber 46 is increased to about 19 ccs of fluid. This represents a greater than 50 percent increase in fluid volume in the working chamber which is sufficient for proper clutch engagement during start-up of the vehicle.

Figure 5:
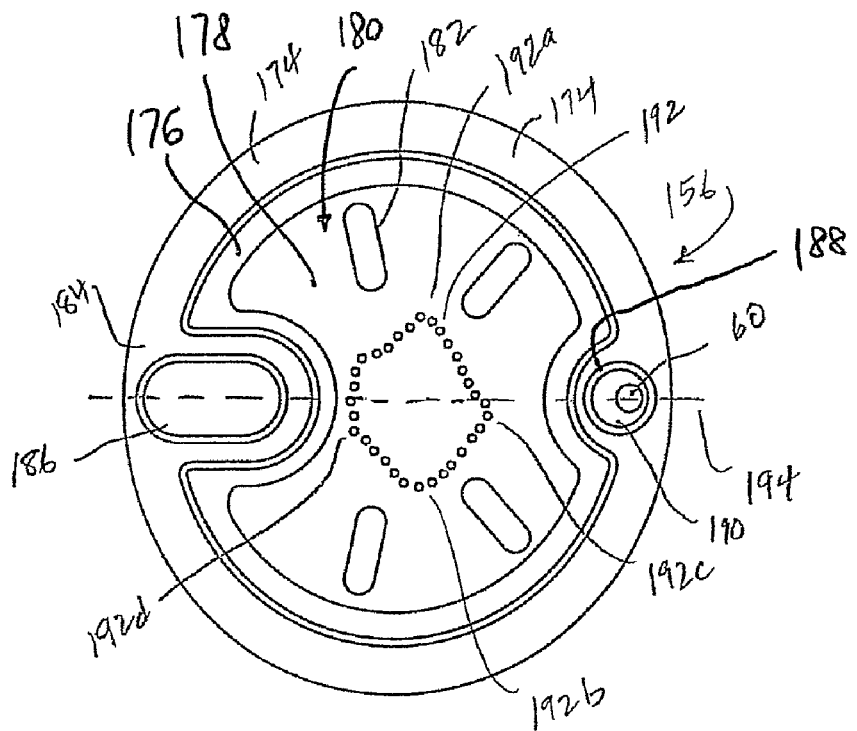
FIG. 5 is a front view of a dividing disk according to an alternative embodiment of the invention.

FIG. 5 illustrates a dividing disk 156 according to an alternative embodiment of the invention. The dividing disk 156 in this case similarly includes an outer circumferential rim 174 that is sized to matingly engage with the opening 54 formed in the clutch output portion 18. A depressed portion 176 is formed around the inner periphery of the rim 174 and merges with a relatively planar disk side-wall 178. The contour of the depressed portion 176 and the disk side-wall 178 defines a cavity 180, disposed radially inwardly from the rim 174. The disk side-wall 178 further includes a plurality of angularly spaced baffle segments such as segment 182. The baffles operate to reduce the vibration generated by rotation of the dividing disk 156.

The outer rim 174 further defines a first generally raised portion 184 which has a generally oval depression 186 formed therein for enhancing proper flow of the viscous fluid within the storage chamber 58 when disposed proximate to the valve. In addition, the outer rim 174 has a second generally raised curved portion 188 defined therein for providing a generally planar seat surface 190 for proper mating engagement with the valve 70. As with the embodiment illustrated in FIGS. 1-4, the dividing disk 156 cooperates with the clutch output portion inner surface 92 to define the fluid storage chamber.

In this embodiment, the dividing disk 156 includes a plurality of pin-hole openings that are arranged in a non-uniform shape for providing drain-back of viscous fluid from the storage chamber to the working gap. The non-uniform shape of the drain-back opening 192 provides a generally uniform amount of drain-back regardless of the angular orientation of the dividing disk 56 and of the clutch assembly 10. The plurality of pin-hole openings are arranged in a non-uniform shape for providing drain-back of viscous fluid from the storage chamber to the working gap. The non-uniform shape provides a generally uniform amount of drain-back regardless of the angular orientation of the dividing disk 156 and of the clutch assembly 10. While not shown in FIG. 5, the dividing disk further includes a central aperture for providing a pressure release vent in one alternative.

The contour of the openings 192 in this case similarly define opposed first and second apex regions 192a, 192b disposed laterally from an axis 194 extending through the valve opening 60 and raised portion 84 of the dividing disk 156. Likewise, the openings 192 define a third apex region 192c, disposed proximate to the valve opening 60 and slightly offset from the axis 194. Due to the available disk real estate and the characteristics of the storage chamber, the openings 192 define a generally flattened region 192d disposed proximate to the disk raised portion 184. Thus, the contour of the drain-back openings 192 conforms to the volume characteristics of the storage chamber, while providing substantially the same amount of fluid drain-back to the working gap in any angular orientation.

Thus, a dividing disk according to an embodiment of the invention permits a selected amount of viscous fluid to spill over from the storage chamber 58 in the direction of an arrow 96 into the working chamber 46 when the electro-viscous clutch assembly 10 is in the off state. When the vehicle enters start-up conditions, the fluid volume in the working chamber 46 is sufficient to behave in a viscous manner. That is, the invention provides sufficient viscous fluid to sustain shear stress that occurs during vehicle start-up conditions, while preventing the cooling fan from operating at an undesired under-speed or stall mode. This enables the engine cooling fan to meet the cooling requirements of the engine. While an alternative solution is to simply oversupply viscous fluid in the working chamber when the clutch assembly is in the off state, this results in greater parasitic losses in the cooling fan. This translates into poor fuel economy. Alternatively, altering the physical or mechanical characteristics of the clutch assembly to operate at greater disengagement speeds also results in reduced cooling fan efficiency and poor fuel economy.

It will be understood by one skilled in the art that the dividing disk of the present invention may be adapted for convenient retrofitting of viscous clutches in the field. It will be seen that the dividing disk motor is sufficiently small that it can be mounted on the clutch output portion without interfering with other components of the clutch assembly.

Accordingly, a viscous clutch assembly with controlled drain back has been described. The assembly provides a convenient way to ensure that an appropriate amount of viscous coupling fluid to sustain shear stress that occurs during vehicle start up conditions is present in the working area, thereby preventing the fan drive from operating in an undesired "stall mode" or under-speed condition. Those skilled in the art should appreciate that the invention is not intended to be limited to the above described currently preferred embodiments. Various modifications will be apparent, particularly upon consideration of the teachings provided herein. For example, other geometric configurations may also be employed in order to provide "drain-back" from the storage chamber to achieve increased viscous fluid in the working area. For example, a geometric pattern could also be formed with the use of spaced slots or by forming other patterns in the dividing disk to permit a selected volume of fluid to flow back into the working chamber during the off-state of the clutch assembly.

What is claimed is:

1. A viscous fluid clutch for a fan assembly, said viscous fluid clutch being movable between an engaged position and a released position, said viscous fluid clutch comprising:
   a clutch input portion;
   a clutch output portion rotatably supported with respect to said clutch input portion, said clutch output portion being adapted to transfer torque to said fan assembly, said clutch output portion cooperating with said clutch input portion to defining a working area;
   a viscous fluid disposed within said working area when said viscous fluid clutch is in said engaged position, said clutch input portion transmitting driving torque to said clutch output portion by shearing said viscous fluid within said working area when said viscous fluid clutch is in said engaged position; and
   a drain-back mechanism defining at least a portion of a viscous fluid storage chamber, said drain-back mechanism disposed to permit viscous fluid flow from said storage chamber to said working area, wherein the viscous fluid flow is a selected amount, and permit substantially the same amount of viscous fluid to flow from said storage chamber to said working area when said viscous fluid clutch is in said released position regardless of the angular orientation of said viscous fluid clutch.

2. The invention as in claim 1 wherein said clutch input portion includes a disk surface defining a plurality of first projections, said clutch output portion includes an inner disk surface having a plurality of second projections disposed in complemental relationship with said first projections of said clutch input portion to define said working area.

3. The invention as in claim 2 wherein said drain-back mechanism is coupled with said clutch output portion to define said viscous fluid storage chamber therebetween.

4. The invention as in claim 3, further comprising:
   an electromechanical actuator assembly disposed proximate to said inner disk surface of said clutch output portion, for providing viscous fluid from the storage chamber to the working area when said viscous fluid clutch is in said engaged position.

5. The invention as in claim 4, wherein the drain back mechanism is a dividing disk including a drain-back opening formed therein for providing a fluid path for viscous fluid to exit said storage chamber when the viscous fluid clutch is in the released position.

6. The invention as in claim 5 wherein the opening has an irregular geometric shape.

7. The invention as in claim 6 wherein the dividing disk includes a valve opening disposed radially outwardly from the drain-back opening.

8. The invention as in claim 7 wherein the electromagnetic actuator assembly comprises:
   a valve sub-assembly having a spring arm with a first end coupled with the clutch output portion and a second end disposed proximate to said valve opening of said dividing disk, said spring arm preventing fluid from flowing through said opening in a closed position and permitting fluid to flow through said opening in an open position; and
   an electromagnetic coil fixedly connected to the said clutch output portion proximate to said spring arm, said coil assembly disposed to move said spring arm from said closed position to said open position upon the receipt of control signals.

9. The invention as in claim 8 wherein the control signals are pulse-width modulated signals.

10. The invention as in claim 1, wherein the drain back mechanism is a dividing disk including a drain-back opening formed therein for providing a fluid path for viscous fluid to exit said storage chamber when the viscous fluid clutch is in the released position.

11. The invention as in claim 10 wherein the opening has an irregular geometric shape.

12. The invention as in claim 1, wherein the drain back mechanism is a dividing disk that includes a plurality of through holes formed therein for providing a plurality of fluid paths for viscous fluid to exit said storage chamber when the viscous fluid clutch is in the released position.

13. The invention as in claim 12 wherein the plurality of through holes define an irregular geometric shape.

14. A dividing disk for use in an electro-viscous fluid clutch operable in an on condition and an off condition, said viscous fluid clutch including a storage chamber for storing viscous fluid and a working chamber for providing a clutch coupling when a selected amount of viscous fluid is resident therein and the electro-viscous clutch is in the on condition, said dividing disk comprising:
   a disk body including a rim portion disposed for fixed attachment to said clutch and a depressed portion, disposed radially inwardly from said rim portion, for at least partially defining said storage chamber; and
   an opening centrally located within said depressed portion of the dividing disk disposed to permit viscous fluid flow from said storage chamber to said working area, wherein the viscous fluid flow is a selected amount, and permit substantially the same amount of viscous fluid to flow from said storage chamber to said working chamber when said viscous fluid clutch is in an off state regardless of the angular orientation of said dividing disk.

15. The invention as in claim 14 wherein the opening has an irregular geometric shape.

16. The invention as in claim 15 wherein the irregular geometric shape of said opening is disposed to permit substantially the same amount of viscous fluid to exit the storage chamber when said viscous fluid clutch is in said off state in each angular orientation of said dividing disk.

17. The invention as in claim 16 wherein the shape of said opening accounts for an internal geometry of said storage chamber.

18. A method for making a rotatable viscous clutch assembly for an engine of a vehicle which has an inoperative condition, a start-up condition, and an operative condition, the clutch assembly including an input section, an output section, a viscous fluid storage chamber, and a working chamber disposed to contain viscous fluid for selectively engaging said input section with said output section when the vehicle is in the operative condition, the method comprising the steps of:
   determining a selected volume of viscous fluid required to be present in the working chamber for engaging the input section with the output section when the vehicle is in the start-up condition;
   developing a contour for a flow path between the storage chamber and the working chamber in a plurality of angular orientations of the viscous clutch assembly such that an amount of viscous fluid will drain back from the storage chamber to the working chamber thereby providing the selected volume of viscous fluid such that substantially the same volume of viscous fluid is in the working chamber when the vehicle is in the inoperative condition; and
   creating the flow path between the storage chamber and the working chamber based on said contour.

\* \* \* \* \*